United States Patent [19]

Tubbs

[11] Patent Number: 4,732,535
[45] Date of Patent: Mar. 22, 1988

[54] FLUID FLOW REVERSING APPARATUS

[75] Inventor: Henry Tubbs, Derby, England

[73] Assignee: Rolls-Royce plc, London, England

[21] Appl. No.: 939,883

[22] Filed: Dec. 9, 1986

[30] Foreign Application Priority Data

Jan. 25, 1986 [GB] United Kingdom ............... 8601829

[51] Int. Cl.⁴ ............................................. F02C 3/06
[52] U.S. Cl. ................................... 415/144; 60/226.2
[58] Field of Search ...................... 415/127, 144, 145; 60/226.2, 228, 229, 230

[56] References Cited

U.S. PATENT DOCUMENTS

| | | | |
|---|---|---|---|
| 3,068,646 | 12/1962 | Fletcher | 415/144 |
| 3,267,668 | 8/1966 | Erwin | 60/229 |
| 3,434,288 | 3/1969 | Petrie | 415/144 |
| 3,620,022 | 11/1971 | Beale | 60/229 |
| 3,824,784 | 7/1974 | Kitson et al. | 60/229 |

FOREIGN PATENT DOCUMENTS

| | | | |
|---|---|---|---|
| 342260 | 1/1931 | United Kingdom | 60/229 |
| 1415509 | 11/1975 | United Kingdom | 60/226.2 |

Primary Examiner—Robert E. Garrett
Assistant Examiner—John T. Kwon
Attorney, Agent, or Firm—Cushman, Darby & Cushman

[57] ABSTRACT

In a multi stage ducted fan or ducted propeller gas turbine engine, a fan flow exit path is provided in the cowl between axially adjacent stages of blades. The stage of blades downstream of the exit are each pivotable to attitudes which on continued rotation of the stage, induces a reverse flow of ambient air into the duct via the nozzle. The normal and reversed airflows meet under the exit path and pass therethrough to atmosphere. The need for blocker doors in the duct is obviated and energy is imported to the fan air passing through the exit by both stages of blades.

4 Claims, 2 Drawing Figures

FLUID FLOW REVERSING APPARATUS

This invention relates to fluid flow reversing apparatus in a ducted fan gas turbine engine wherein the fan comprises a pair of contra rotating fan stages.

Known reversing apparatus in conventional single or multi stage ducted fans comprises moving cowl portions allied to blocker doors of which the latter pivot into and out of the air flow through the fan duct, at a position downstream of the or all of the fan stages and any fan cowl supported structure. By cowl supporting structure is means aerofoil struts which maintain the cowl in spaced relationship with the core gas generator casing.

It is also known to position the reverser outlet in the fan cowl, between the stage of fan blades and the cowl supporting struts immediately downstream thereof. In such an arrangement, the struts provide the cores of respective hollow aerofoils each of which is pivotable with or about its respective core strut, to a position in which it blocks a portion of the duct. In toto, the aerofoils entirely block the duct. Pivotable doors in the duct are thus obviated, making for a lighter, more integral cowl structure.

The arrangement described hereinbefore, all depend entirely on duct blocking by structure in order to obtain a reversed flow.

The invention seeks to provide an improved fluid flow reversing apparatus.

According to the present invention, fluid flow reversing apparatus in the fan duct of a ducted fan gas turbine engine comprises a cowl which defines the outer wall of the duct, a fluid flow exit path in the cowl, a first stage of rotatable blades in the duct and upstream of the fluid flow exit path, a second stage of rotatable blades in the duct and downstream of the fluid flow exit path, means for covering and uncovering the fluid flow exit path and wherein the blades of the second stage are pivotable to an attitude which on continued rotation of the second stage, induces a reversed flow of ambient air via the duct nozzle, in opposition to the flow induced by the first stage of blades, which flows meet radially inwardly of the fan flow exit path and pass therethrough when it is uncovered.

Preferably the fan flow exit path blocking means comprises a cowl portion which is slidable axially of the remainder thereof to a position downstream of the exit path.

The exit path may contain louvres positioned so as to deflect fan flow which passes therethrough, in a direction having an upstream component.

The invention will now be described, by way of example and with reference to the accompanying drawings in which.

Figure 1:
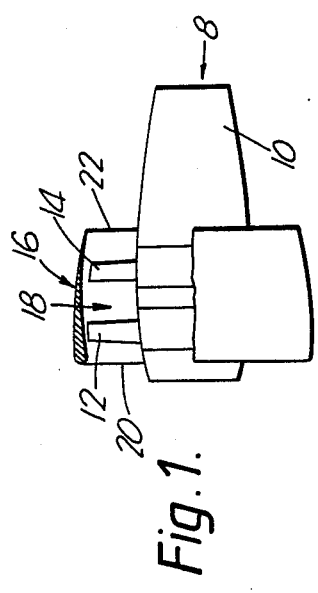
FIG. 1 is a diagrammatic view of a ducted fan, gas turbine engine in accordance with an aspect of the present invention.

Referring to FIG. 1. A core gas generator 8 is enclosed in a streamlined casing 10 in known manner. The core gas generator is comprised of a compressor, combustion equipment and a turbine none of which are shown, but which are arranged in flow series again in generally known manner.

A pair of contra-rotating stages of fan blades 12 and 14 are mounted for rotation about the axis of the core gas generator. The fan stages 12 and 14 may be directly driven via a shaft connection (not shown) to a turbine stage (not shown). Alternatively, they could be driven by gears (not shown) which derive their power from the turbine assembly that drives the compressor (not shown).

The stages of fan blades 12 and 14 are surrounded by a cowl 16 and so operate in a duct 18 defined by the cowl 16 and the core gas generator casing 10.

The air intake of the fan duct 18 is indicated by the numeral 20 and the thrust nozzle of the fan duct 18 is indicated by the numeral 22.

Figure 2:
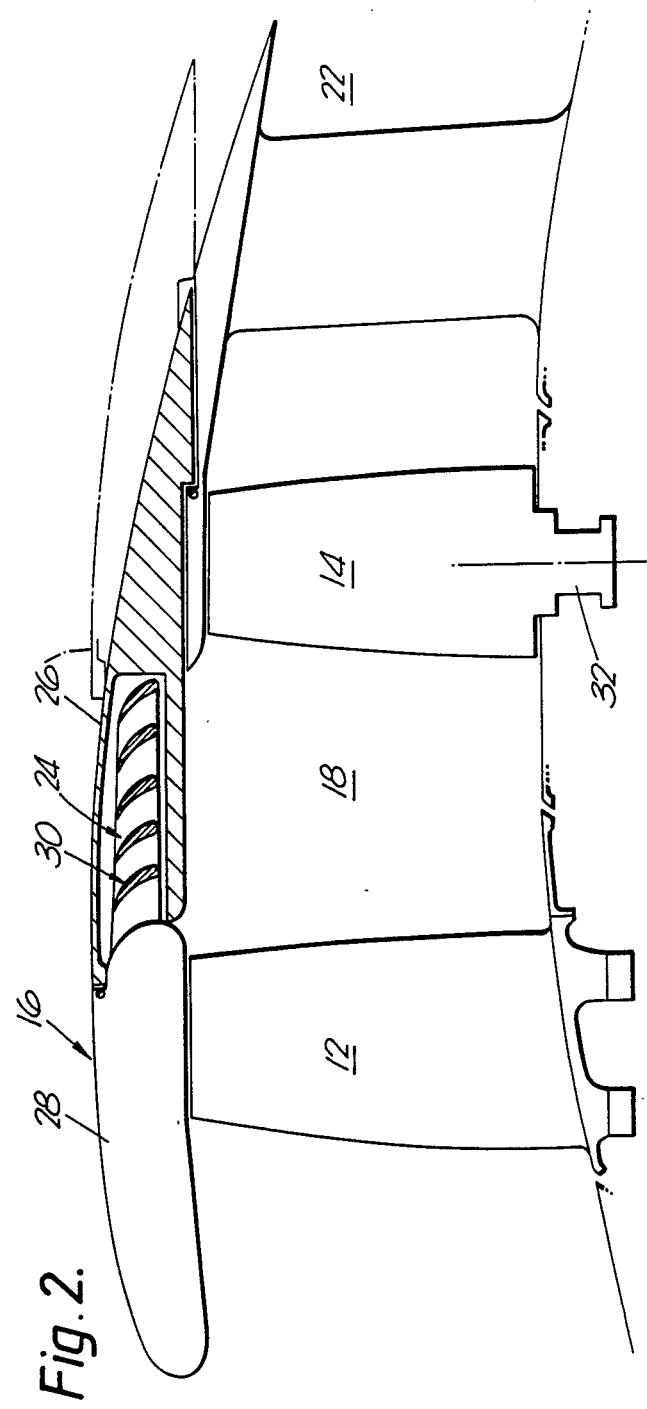
FIG. 2 is an enlarged, cross sectional part view of FIG. 1.

Referring now to FIG. 2. The fan cowl 16 includes within its length, a fan flow exit path 24, its precise location being between the fan stages 12 and 14.

The cowl 16 has a mid portion 26 which is slidable axially of the remainder so as to cover or uncover the exit path 24. The sliding of the mid cowl portion 26 may be achieved by rams (not shown) or any other known, suitable device. The rams (not shown) or device would be mounted within the hollow forward portion 28 of the cowl 16, in known manner.

In the example of FIG. 2, louvres 30 are provided in the exit path so that any fan flow which occurs therethrough will be guided into a substantially upstream direction.

The downstream stage of fan blades 14 are each mounted on stub shafts 32 for pivoting movement about respective radial axes, so that their attitudes to the fan flow leaving the fan stage 12 may be varied from a position in which the fan stage 14 adds energy to the flow in a downstream direction, to a position in opposition to thereto and such that the stage 14 actually induces a flow of ambient air into the nozzle 22. The pivoting of the blades 14 again may e achieved by any suitable mechanisms many of which are known to those skilled in the art.

In normal flight of an aircraft powered by the ducted fan gas turbine engine described hereinbefore, the stages of fan blades 12 and 14 will be in attitudes with respect to the airflow through duct 18 as will result in forward thrust being generated on the aircraft. On landing of the aircraft, the mid cowl portion 26 will be caused to move in a downstream direction to the position shown in chain dotted lines, so as to expose the fan flow exit path 24 and, at the same time, the fan blades 14 will be caused to rotate to attitudes in which their pumping action will generate an inflow of ambient air via the nozzle 22 into the duct 18. Two opposing airflows are now in the duct 18 and these airflows meet under the exit path 24 and proceed to flow therethrough out of the duct 18. The louvres 30 deflect the expelled air forwardly of the cowl and so provide a braking effect on the aircraft.

The operation of the mid cowl portion and rotating of the fan blades are synchronised so as to ensure a smooth transition from forward thrust on the aircraft, to reverse thrust thereon.

The pumping action of the fan blades 14 generates a larger volume of reversed flow of air than does simple blocking by known pivotable doors. Moreover, the arrangement obviates the doors and thus saves considerable weight. This is particularly advantageous where the ducted fan gas turbine engine in which the invention is incorporated, is of the kind known as a ducted propeller engine. The latter type is considerably larger in diameter than its counterpart, for a given performance.

The invention has been described herein, in connection with ducted fan and ducted propeller gas turbine engines in which the stages of blades or propellers are contra rotating. The invention may be utilised however, in a situation where the stages of fan or propeller blades rotate in a common direction. The criteria is that the stage or stages of blades immediately downstream of the flow exit path in the cowl wall, may have their attitudes adjusted with respect to the airflow through the duct, so as to induce air into the duct via the thrust nozzle. Further, no stage of blades must be radially aligned with the fan flow exit path. Fixed stators (not shown) should be provided however, if the blade stages do rotate in a common direction, so s to ensure that during normal flight of an aircraft powered by the engine of the present invention, fan air flow is directed at the proper angle to the leading edges of the downstream stage of blades. The stators may be used in conjunction with fixed struts 32 or instead of then, to maintain the cowl 16 in fixed spaced relationship with the core engine casing 10.

I claim:

1. Fluid flow reversing apparatus in the fan duct of a ducted fan gas turbine engine comprising a cowl which defines the outer wall of the fan duct, a fluid flow exit path in the cowl, a first stage of rotatable blades in the duct and upstream of the fluid flow exit path, a second stage of rotatable blades in the duct and downstream of the fluid flow exit path means for covering and uncovering the fluid flow exit path and wherein each of the blades of the second stage of rotatable blades are pivotable about a longitudinal axis thereof to an attitude which on continued rotation of the second stage, induces a reversed flow of ambient air via the duct nozzle, in opposition to the flow induced by the first stage of rotatable blades, which flows meet radially inwardly of the fan flow exit path and passes therethrough when it is uncovered.

2. Fluid flow reversing apparatus as claimed in claim 1 wherein the fan flow exit path covering and uncovering means comprises a mid portion of the cowl, which is translatable axially of the remainder thereof so as to cover or uncover the fan flow exit path.

3. Fluid flow reversing apparatus as claimed in claim 1 wherein the fan flow exit path contains louvres which are positioned so as to deflect fan flow which passes therethrough, in a direction which has an upstream component.

4. Fluid flow reversing apparatus as claimed in claim 3 wherein in operation the first and second stages of blades contra rotate relative to each other.

* * * * *